United States Patent [19]

Semeia

[11] Patent Number: 5,190,030
[45] Date of Patent: Mar. 2, 1993

[54] VALVE FOR REGULATORS IN SELF-CONTAINED UNDERWATER BREATHING APPARATUS

[75] Inventor: Roberto Semeia, San Salvatore di Cogorno, Italy

[73] Assignee: Scubapro Europe S.r.l., Casarza Ligure, Italy

[21] Appl. No.: 838,868

[22] Filed: Feb. 21, 1992

[30] Foreign Application Priority Data

Mar. 8, 1991 [IT] Italy .................. GE91 U 000007

[51] Int. Cl.⁵ .............................................. A62B 7/04
[52] U.S. Cl. .................... 128/204.26; 128/201.27; 128/201.28; 128/205.24
[58] Field of Search ............... 128/20.26, 20.27, 20.28, 128/204.26, 205.24; 251/337

[56] References Cited

U.S. PATENT DOCUMENTS

| | | | |
|---|---|---|---|
| 3,898,978 | 8/1975 | Marcus ...................... | 128/204.17 X |
| 4,356,820 | 2/1982 | Trinkwalder, Jr. ............ | 128/204.26 |
| 4,428,392 | 1/1984 | Jones et al. ................ | 128/205.24 X |
| 5,052,383 | 10/1991 | Chabert ........................ | 128/204.26 |

Primary Examiner—V. Millin
Assistant Examiner—Raleigh Chiu
Attorney, Agent, or Firm—Jacobson, Price, Holman & Stern

[57] ABSTRACT

A valve for regulators in self-contained underwater breathing apparatus includes a tubular plug (9) axially slidably accommodated in two sealingly separated adjacent chambers (6,7). Of these two chambers, the so-called pressure chamber (6) is connected with a pressurized gas source, and is provided with a seat (11) for cooperating with the matching edge (109) of the tubular plug (9), and the so-called compensation chamber (7) is formed with a hole or holes (107) connected with the ambient medium, and has the relative end portion of the tubular plug (9), which is in form of a flaring-out expansion head (209) connected with the valve outlet (12), sealingly guided therein. A helical spring (10) is arranged between the expansion head (209) and the opposite partition (8), dividing the two chambers from each other. In order to prevent any heat exchange between the compensation chamber and the plug (9), which is liable to be cooled owing to gas expanding into the expansion head (209), the invention provides a heat insulating member (13) which is placed at least between the helical spring (10) and the expansion head (209).

8 Claims, 1 Drawing Sheet

VALVE FOR REGULATORS IN SELF-CONTAINED UNDERWATER BREATHING APPARATUS

SUMMARY OF THE INVENTION

The object of the invention is a valve for regulators in self-contained underwater breathing apparatus, which is fitted with a tubular plug axially slidably accommodated in two sealingly separated adjacent chambers, and of these two chambers, the so-called pressure chamber is connected with a pressurized gas source and is provided with a seat for cooperating with the matching edge of the tubular plug, and the so-called compensation chamber is formed with a hole or holes connected with the ambient medium, and has the relative end portion of the tubular plug, which is in form of a flaring-out expansion head connected with the valve outlet, sealingly guided therein, a helical spring being arranged between the said expansion head and the opposite partition dividing the said two chambers from each other.

In the valves of this kind, the delivered gas flowing through the tubular plug, expands in the region of the flaring-out expansion head, so that the tubular plug is considerably cooled, down to very low temperatures getting close to the water-freezing temperature. The construction of the known valves is such that a heat exchange is allowed between the helical spring and the expansion head, and between the tubular plug and the interior of the compensation chamber. Thus, cold propagates also to the compensation chamber which is accordingly cooled. In a valve for regulators of underwater breathing apparatus, particularly in the first-stage valve of two-stage regulators, the compensation chamber is full of water which is substantially still therewithin. The transfer of cold from the tubular plug, particularly from its expansion head, may cause the water in the compensation chamber to become frozen, which results in a malfunctioning, or even a jamming of this valve.

The invention aims to provide a valve for self-contained underwater breathing apparatus, by which the aforementioned inconveniences are eliminated in a not much expensive manner and with the use of means being easily applicable even to existing valves.

The invention attains these objects by the provision of a valve for self-contained underwater breathing apparatus of the type as disclosed at the outset, in which a heat insulating member is provided between the helical spring and the flaring-out expansion head of the tubular plug.

The heat-insulating member may be of any desired kind, for example in form of a hollow member made from a material that may even not be an insulating material, and being filled with an insulating matter, such as a gas, a liquid, or any other insulating substance, or in form of a washer made from a suitable insulating material, such as a thermoplastic, a thermosetting, or a like material.

The heat insulating member inhibits or anyhow substantially limits any heat transfer between the expansion head and the helical spring. This prevents a cooling of the helical spring, which may involve a change in its springiness, as well as a cooling of the water contained in the compensation chamber, which may even become frozen.

According to a further improvement, the heat insulating member further extends at least partly, and preferably over a substantial length about that section of the tubular plug which is accommodated in the compensation chamber.

In this case, the heat insulating member consists of a sleeve laid on the tubular plug, with an outside diameter which is smaller than the inside diameter of the helical spring, and with its fore end which is associated with the expansion head, being provided with an annular flange fitted between the helical spring and the expansion head.

Thus, also any direct heat exchange between the tubular plug and the water contained in the compensation chamber, is prevented or substantially limited.

The heat insulating properties of the insulating material must be such that the temperature in the compensation chamber be always higher than that of the tubular member, at least during a limited period of time corresponding to the length of a normal diving time.

The invention will appear more in detail from the following description of one preferred embodiment thereof.

DESCRIPTION OF THE PREFERRED EMBODIMENT

Figure 1:
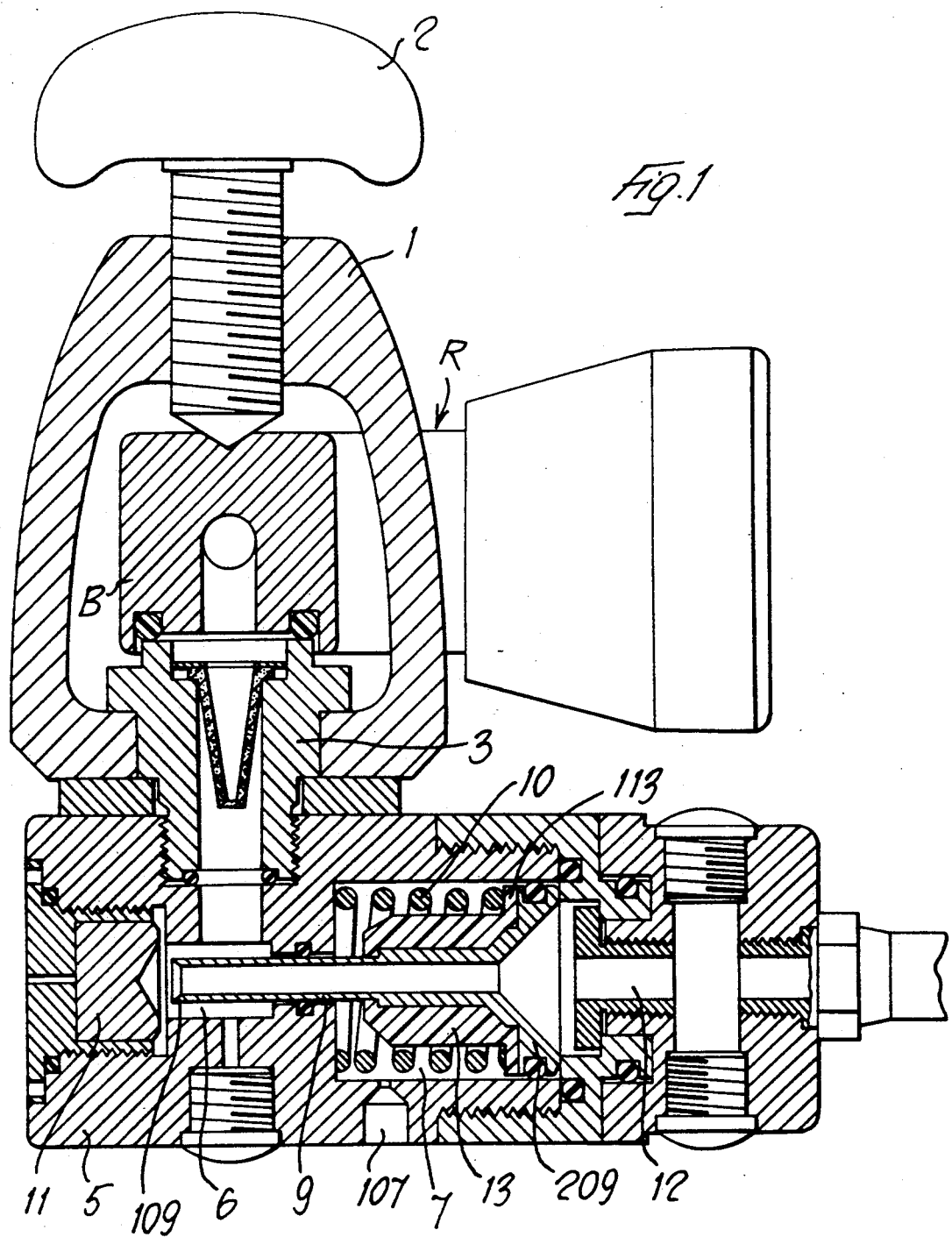
FIG. 1 is an axial sectional view through a valve according to the invention.

The valve shown in the Figure, constitutes the first pressure-reducing stage of air or a physiologic mixture of oxygen and other suitable gases, in an automatic two-stage regulator for self-contained underwater breathing apparatus. This valve is applied to the outlet B of a cock R fitted on a not-shown cylinder, and containing air under pressure or a pressurized physiologic mixture of oxygen and other suitable gases. Through a tubular inlet connector 3, the valve body 5 is connected to the outlet B of cock R by means of a clamping unit, consisting of a stirrup 1 and a cooperating clamping screw 2.

Longitudinally formed in the valve body 5 are two coaxial chambers 6 and 7 that are separated by a partition 8, in which a duct 108 is provided for the two chambers to be connected with each other. The one chamber, the so-called pressure chamber 6, communicates with the outlet B of cock R, and air under pressure or a pressurized gas mixture is supplied thereto, while the other chamber, the so-called compensation chamber 7, communicates with the ambient medium through a hole 107 which preferably is suitably choked, so that in diving conditions this hole is filled with water at a pressure corresponding to the diving depth. A tubular plug 9 normally of a metallic material, is sealingly passed through duct 108, so as to be slidable therein. On the one hand, the tubular plug 9 extends into the pressure chamber 6, and ends by a spout-like edge 109. On the other hand, the tubular plug 9 extends into the compensation chamber 7, and has its opposite end portion which is in form of a conically flaring, air- or gas-expansion head 209, sealingly guided in the said compensation chamber 7, so as to be slidable therein. The expansion head 209 communicates with the valve outlet 12 provided close to that end side of the compensation chamber 7 which is in facing relation with the expansion head 209. The spout-like edge 109 cooperates with a valve seat consisting of a replaceable block 11 preferably of a non-metallic material, so as to regulate the air or gas outflow through the tubular plug 9, from the cock outlet B, that is, from the pressure chamber 6, to the valve outlet 12. In the compensation chamber 7 a helical spring 10 is provided, and is arranged between the expansion head 209 and the partition 8 dividing the two chambers 6 and 7 from each other. That section of the tubular plug 9 with the expansion head 209 at its end, which is accommodated in the compensation chamber 7, is covered for a substantial portion of its length by a sleeve 13 of heat insulating material. The end of sleeve 13 which is associated with the expansion head 209, is formed with an annular flange 113 extending around the expansion head outward edge, over its face which is turned inwardly of the compensation chamber 7, and being fitted between the helical spring 10 and the expansion head 209, so that any heat exchange therebetween is prevented or substantially limited. The sleeve 13 has an outside diameter that is smaller than the inside diameter of the helical spring, and is caused to perfectly adhere to the tubular plug 9 over its entire length. The sleeve 13 end side pointing toward the partition 8 provided between the compensation chamber 7 and the pressure chamber 6, terminates at a distance from the said partition 8. Such a distance substantially corresponds to the travel of the tubular plug 9 being caused to slide from the fully opened position of the valve into the position for stopping the flow of the delivered air or gas, in which the spout-like edge 109 is sealed against the block 11. The sleeve 13 may be made from any kind of material having suitable insulating properties.

Thanks to the provision of the sleeve 13, the cooling of the tubular plug 9, which results from the outflowing air or gas expanding into the expansion head 209, does not propagate to the compensation chamber 7, i.e., to the water or the fluid contained therein, nor directly from the relative section of the tubular plug, nor through the helical spring. Thus, the temperature of water in the compensation chamber 7 is always kept higher than that of the tubular plug 9, and over the water-freezing temperature, at least during a normal diving time, so that a malfunctioning or a possible jamming of the valve, as well as any inherent risks for a user, are avoided.

I claim:

1. A valve for a regulator in a self-contained underwater breathing apparatus, which comprises two sealingly separated adjacent chambers, a pressure chamber and a compensation chamber, a partition dividing the two chambers, a tubular plug which is at least partially within each of the chambers, a heat insulating member and an outlet, the pressure chamber having means to connect it with a pressurized gas source and having a seat adapted to cooperate with a matching edge of the tubular plug, the compensation chamber having at least one hole which connects it to ambient medium, having one end of the tubular plug which is in the form of a flaring-out expansion head, which is connected with the valve outlet, and having a helical spring sealingly guided therein between the expansion head and the partition, the heat insulating member being fitted between the helical spring and said flaring-out expansion head and constituting means to prevent heat exchange between the helical spring and the expansion head.

2. A valve according to claim 1 wherein a heat insulating member extends at least partly over a section of the tubular plug which is in the compensation chamber and thus prevents or substantially limits direct heat exchange between said compensation chamber and the part of the tubular plug over which the heat insulating member extends.

3. A valve according to claim 2 wherein the heat insulating member extends over a substantial length of said tubular plug.

4. A valve according to claim 2 wherein the heat insulating member is formed from an insulating material suitable for preventing or substantially limiting any heat exchange between the tubular plug and the compensation chamber, so that the temperature in the compensation chamber is maintained at a higher level than the freezing point of fluid therein during normal diving time.

5. A valve according to claim 2 wherein the heat insulating member consists of a sleeve of insulating material in direct contact with and enclosing the section of the tubular plug which is within the compensation chamber substantially over its entire length.

6. A valve according to claim 5 wherein the sleeve has one end in the form of an annular flange extending around the expansion head and having a surface facing the compensation chamber, the flange being positioned between the expansion head and the helical spring.

7. A valve according to claim 5 wherein the sleeve has an end within the compensation chamber, remote from the annular flange and at a distance from the partition which substantially corresponds to a travel distance traversed by the tubular plug when it slides from a fully-open valve position to a closed valve position, or vice versa.

8. A valve according to claim 5 wherein the sleeve is composed of a thermoplastic, a thermosetting or another insulating material, or consists of a hollow body having its internal cavity filled with suitable insulating matter.

* * * * *